United States Patent [19]

Braun

[11] Patent Number: 4,513,733
[45] Date of Patent: Apr. 30, 1985

[54] OIL FIELD STEAM PRODUCTION AND USE

[75] Inventor: Minel J. Braun, Akron, Ohio

[73] Assignee: The Babcock & Wilcox Company, New Orleans, La.

[21] Appl. No.: 441,322

[22] Filed: Nov. 12, 1982

[51] Int. Cl.³ .................................................. F24J 3/02
[52] U.S. Cl. ..................... 126/435; 126/452; 126/451; 166/266; 166/57
[58] Field of Search ............... 126/451, 438, 439, 435, 126/430, 452, 436; 166/57, 266, 267, 272, 303

[56] References Cited

U.S. PATENT DOCUMENTS

| | | | |
|---|---|---|---|
| 2,182,545 | 12/1939 | Pace | 166/57 |
| 3,064,418 | 11/1962 | Sanders | 126/451 X |
| 3,498,381 | 3/1970 | Earlougher | 166/57 X |
| 3,908,632 | 9/1975 | Poulsen | 126/435 |
| 4,156,545 | 5/1979 | Blanchard, Jr. et al. | 166/303 X |
| 4,174,752 | 11/1979 | Slater et al. | 126/435 X |
| 4,195,620 | 4/1980 | Rust | 126/425 |
| 4,249,605 | 2/1981 | Slater et al. | 126/435 X |
| 4,296,739 | 10/1981 | Bolding | 126/435 X |
| 4,313,304 | 2/1982 | Hunt | 126/435 X |
| 4,333,445 | 6/1982 | Lee | 126/435 X |

Primary Examiner—Larry Jones
Attorney, Agent, or Firm—James C. Simmons; Robert J. Edwards

[57] ABSTRACT

A method and apparatus for oil field steam production and use. Heated refractory particles are flowed through a steam generator in heat exchange relation with well water to generate steam. In accordance with one aspect of the invention, the steam is flowed into a well to heat oil in the well. In accordance with another aspect of the invention, the refractory particles are heated by flowing through a solar receiver in heat exchange relation with solar radiation.

14 Claims, 1 Drawing Figure

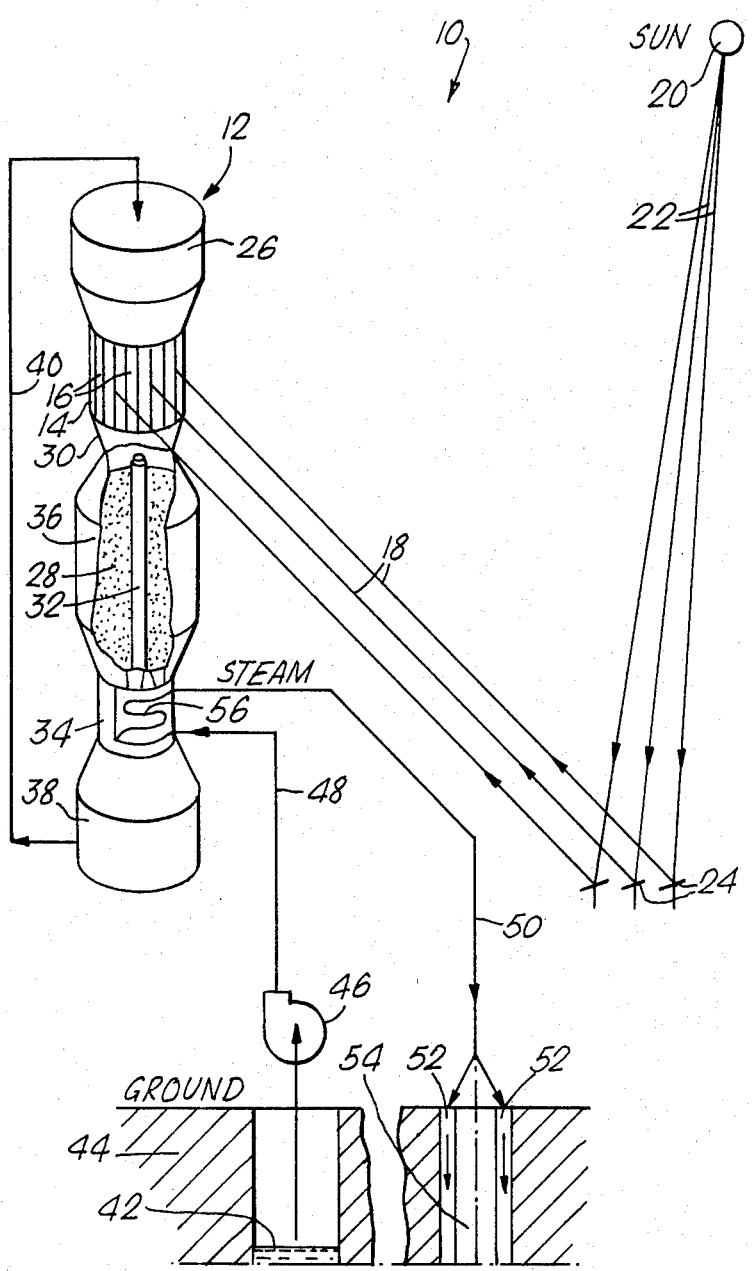

OIL FIELD STEAM PRODUCTION AND USE

This invention relates to oil recovery. More particularly, this invention relates to the production of high pressure steam from well water for use in heating the oil in a well for recovery thereof.

As oil becomes more difficult to locate and produce, it has become advantageous to drill for oil and recover oil from greater and greater depths and to use secondary oil recovery methods which may require the use of steam for heating the oil so that it may be recovered from geological formations and/or so that it may flow sufficiently to be recovered.

A typical oil field installation is located away from a convenient source of steam heat. Since it is not important to minimize the amount of dissolved solids or degree of contamination of the steam entering the well for use, it is considered advantageous to be able to use untreated well water (that is, brackish water) for such steam production.

Flowing untreated well water with its large quantity of dissolved solids such as salt through a steam generator in heat exchange relation with flue gases of a typical fossil fuel-fired steam generator or with solar radiation energy of a solar receiver is not considered economically feasible since the temperatures of flue gases and solar radiation directed onto a receiver are typically in the range of 2000 to 3000 degrees Fahrenheit at which temperatures there is a likelihood of severe corrosion and tube failures if untreated well water is flowed in heat exchange therewith.

The use of a reboiler system wherein sufficiently pure water is flowed in heat exchange relation with flue gases or solar radiation energy and the steam produced therefrom is flowed in heat exchange relation with well water is limited to producing steam from well water at pressures not over about 600 to 800 psi due to inherent heat exchange limitations (that is, those limitations resulting from the properties of steam as shown on a Mollier diagram). However, the depths of penetration of many typical oil wells is such as to require higher steam pressures in the range of 2200 to 3000 psi for secondary oil recovery.

It is therefore an object of the present invention to generate steam at pressures in the range of 2200 to 3000 psi from untreated well water without the disadvantages described above.

It is another object of the present invention to use an inexpensive and readily accessible heat source to generate such steam.

It is still another object of the present invention to generate such steam for secondary oil recovery on a continual basis; that is, 24 hours a day.

It is yet another object of the present invention to generate such steam by utilizing solar radiation energy with low cost and maintenance.

It is another object of the present invention to eliminate the economical unattractive alternatives of the prior art in order to provide a significant advantage for generation of high pressure steam from untreated well water for secondary oil recovery at the typical depths of oil well penetration.

It is another object of the present invention to provide an apparatus and method for high pressure steam generation from untreated well water which is simple in design, rugged in construction, economical to manufacture, and economical to operate and maintain.

The various features of novelty which characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

IN THE DRAWINGS

The FIGURE is a view, partly perspective with parts broken away and partly schematic, of oil heating apparatus embodying the present invention.

Referring to the drawing, there is shown an apparatus generally indicated at 10 for generation and delivery of steam to an oil well to heat oil and dissolve it out of its geological formation for secondary oil recovery. A solar powered steam generator for generating such steam is indicated at 12. The steam generator 12 is provided with a solar receiver 14 which includes about its periphery a plurality of panels 16 of tubes or other heat exchange means for flowing a medium therethrough in heat exchange relation with solar radiation energy directed onto the panels 16 as schematically shown by arrows 18. The solar radiation energy 18 is directed onto the panels 16 from the sun schematically illustrated at 20 by redirection of the suns rays 22 onto the panels 16 by means of a field of heliostat mirrors schematically illustrated at 24.

An heat exchange medium is introduced into the solar receiver from hopper 26 under gravitational force to flow vertically downwardly through the solar receiver 14 in heat exchange relation with the solar radiation energy 18 to receive heat therefrom.

If molten salts or liquid metals are used as an heat exchange medium, functional containment and environmental problems result. Among these is the continual requirement of keeping the molten salt or liquid metal in a fluid state in all tube passages and storage areas. A breakdown in the plant, forcing even a temporary shutdown, may cause the solidification of the molten salt or liquid metal resulting in extremely difficult problems for restarting the plant. In addition, molten salt is corrosive to the usual metal surfaces with which it comes in contact. Molten metal such as liquid sodium can also be dangerous when brought in contact with air or water.

In order to provide a medium for flowing through the solar receiver in heat exchange relation with the solar radiation energy that is inexpensive, environmentally safe, non-corrosive, and does not present operating difficulties if its temperature drops below or rises above normal operating temperatures, in accordance with the present invention the medium which is provided is a moving bed of sand or other refractory particles illustrated at 28 which remain in the form of granulated solids throughout the normal operating and shut-down temperatures of the steam generator 12. By "moving bed" is meant granulated solids in a process vessel that are circulated (moved) either mechanically or by gravity flow. This is in contrast to a "fluidized bed" which is defined herein as a cushion of air or hot gas or liquid floating or otherwise conveying a powdered material through a process vessel. The free flowing refractory particles 28 are preferably spherical in shape, have a uniform size of preferably about 100 microns, and are of course preferably inexpensive. Acceptable materials include but are not limited to silica sand, barytes sand (barium sulfate), partially calcined clay, glass beads, and reclaimed petroleum catalysts. In the embodiment of the invention described herein, silica sand is used as the heat exchange medium.

After flowing through tubes or other heat exchange means in the solar receiver, the hot refractory particles 28 flow by gravity to a mixing chamber 30 from which some of the particles may be directed through a thru-feeding duct 32 for immediate feeding under gravitational force to heat exchanger 34. In order for the steam generator 12 to have the capacity to generate steam continually, one or more hot refractory particle reservoir means 36 is provided to store the hot refractory particles for use during periods of low solar insolation such as at night.

The hot refractory particles 28 are delivered from the bottom of the thru-feeding duct 32 and/or reservoirs 36 as the solar insolation conditions and steam use require to the heat exchanger 34 preferably under gravitational force to flow downwardly in heat exchange relation with water flowing through tubes illustrated at 56 thereof. After yielding its thermal energy to the water, the cool energy wasted sand or refractory particles is collected in storage bin 38. It is preferable that the heat exchanger 34 be located below the thru-feeding duct 32 and reservoirs 36 which are in turn preferably located below the receiver 14 to advantageously allow the flow of refractory particles from the hopper 26 through the heat exchange cycle to the storage bin 38 under the force of gravity so as to eliminate any requirements for complicated mechanical handling of the hot refractory particles.

As needed, the cooled refractory paticles 28 are transported to the hopper 26 by suitable means schematically illustrated at 40 such as, for example, a belt, bucket conveyors, or an Archimedes screw conveyor, and the cycle is repeated.

In accordance with the present invention, untreated brackish well water illustrated at 42 is pumped out of the ground illustrated at 44 by suitable means such as immersion pump 46 through line 48 to the heat exchanger 34 wherein the water 42 is flowed preferably in counter-flow or cross-flow heat exchange relation with the hot refractory particles 28 in a once-through arrangement to receive heat from the hot refractory particles 28 to generate saturated quality steam. The resulting steam is then delivered by suitable means such as line 50 and spaces 52 to the location of oil in well illustrated at 54 for heating the oil for secondary oil recovery.

In accordance with a preferred embodiment of the present invention, refractory particles 28 are flowed downwardly through the solar receiver 14 in heat exchange relation with solar radiation 18 to heat the refractory particles 28 to thereby result in reduced cost and maintenance of solar panels since they are not subject to high mineral content water; ie, well water. Although solar energy for generating steam is a free and renewable source of energy, and although the use of a solar receiver in the steam generator 12 takes advantage of many oil fields being situated in warm climates compatible with the use of solar energy, other suitable means such as the burning of fossil fuel in fossil fuel-fired boilers may be used to provide heated refractory particles for flowing through the steam generator 34.

Some of the refractory particles may then be flowed downwardly through thru-feeding duct 32 afterwhich they are immediately flowed downwardly through steam generator 34 in heat exchange relation with well water 42 which is flowed through the steam generator through tubes 56 to heat the well water to generate steam. The remaining refractory particles 28 may be stored in reservoir 36 for use at a later time. The generated steam is then flowed through line 50 into the spaces 52 to heat oil in the well 54 for secondary oil recovery.

In a typical secondary oil recovery installation, 16,300 lbs per hour of sand may be flowed through the solar receiver 14 and heat exchanger 34. In contrast to the unacceptable corrosion levels which would result if flue gas or solar radiation in the higher temperature range of 2000 to 3000 degrees Fahrenheit were used for directly heating untreated well water, sand or other refractory particles is used as the heat exchange medium to reduce to very low levels the degree of corrosion and wear of solar panel tubes to thereby reduce the tube failure rate and solar receiver maintenance costs. The sand enters the solar receiver 14 at about 225 degrees Fahrenheit and is heated to about 1200 to 1300 degrees Fahrenheit in the solar receiver. In its passage through the heat exchanger 34 the temperature of the sand is reduced back to 225 degrees Fahrenheit in heating well water flowing in counterflow relation to the sand at an inlet temperature of 150 degrees Fahrenheit and at a rate of 3455 lbs per hour. Steam of a quality of 0.8 is generated at a pressure of 1000 psi.

By varying the flow rate of sand through the solar receiver and the solar receiver panel sizes in accordance with engineering principles of common knowledge to those of ordinary skill in the art to which this invention pertains, a sand temperature at the outlet of the solar receiver 14 in the range of 1500 to 1800 degrees Fahrenheit can be provided. Such a sand temperature is capable of heating water in the heat exchanger 34 to provide saturated steam in the temperature range of 650 to 695 degrees Fahrenheit which corresponds to pressures in the range of 2200 to 3000 psi suitable for deep penetration in oil wells.

It is believed that significant erosion of heat exchanger tubes by flowing sand will not occur as long as the velocity of sand through the heat exchanger tubes is less than 5 feet per second.

A particular construction of an apparatus for heating oil for secondary oil recovery in accordance with this invention can be designed using engineering principles of common knowledge to those of ordinary skill in the art to which this invention pertains. Certain features of this invention may sometimes be used to advantage without a corresponding use of the other features. It is also to be understood that the invention is by no means limited to the specific embodiments which have been illustrated and described herein, and that various modifications thereof may indeed be made which come within the scope of the present invention as defined by the appended claims.

I claim:

1. A method of heating oil in a well comprising:
   a. flowing heated refractory particles through a steam generator;
   b. pumping untreated well water the source of which is the ground from out of the well through a first cavity in the ground and through tube means in the steam generator in heat exchange relation with the heated refractory particles to heat the untreated well water to generate steam; and
   c. flowing the steam into the well through a second cavity in the ground to heat oil in the well.

2. A method of heating oil in a well comprising:

a. flowing refractory particles through a solar receiver in heat exchange relation with solar radiation to heat the refractory particles;
b. flowing the heated refractory particles through a steam generator;
c. pumping untreated well water the source of which is the ground from out of the well through a first cavity in the ground and through tube means in the steam generator in heat exchange relation with the heated refractory particles to heat the untreated well water to generate steam; and
d. flowing the steam into the well through a second cavity in the ground to heat oil in the well.

3. A method according to claim 2 further comprising disposing the steam generator below the solar receiver and gravity flowing the refractory particles through the steam generator and solar receiver.

4. A method according to claim 2 further comprising storing at least a portion of the heated refractory particles for use in generating steam during periods of low solar insolation.

5. A method according to claim 4 further comprising disposing the steam generator below the solar receiver and gravity flowing the refractory particles through the steam generator and solar receiver.

6. A method according to claim 5 further comprising transporting the cooled refractory particles to the solar receiver for again flowing through the solar receiver.

7. A method according to claim 5 further comprising storing the heated refractory particles at a location which is intermediate the solar receiver and the steam generator.

8. Apparatus for heating oil in a well comprising solar receiver means for flowing refractory particles in heat exchange relation with solar radiation energy to heat the refractory particles, means for pumping untreated well water the source of which is the ground from out of a well through a first cavity in the ground, steam generating means for flowing untreated well water pumped from the well through tube means in heat exchange relation with the heated refractory particles to generate steam, and means for routing the steam into the well through a second cavity in the ground to heat oil in the well.

9. Apparatus according to claim 8 further comprising a moving bed of refractory particles for flowing through said solar receiver and said steam generator.

10. Apparatus according to claim 8 wherein said steam generator is disposed below said solar receiver for gravity flowing of the refractory particles through the solar receiver and steam generator.

11. Apparatus according to claim 8 further comprising means for storing at least a portion of the heated refractory particles for use in generating steam during periods of low solar insolation.

12. Apparatus according to claim 11 wherein said steam generator is disposed below said solar receiver for gravity flowing of the refractory particles through the solar receiver and steam generator.

13. Apparatus according to claim 12 further comprising means for transporting the cooled refractory particles to the solar receiver for flowing through the solar receiver.

14. Apparatus according to claim 12 wherein said storage means is disposed intermediate said solar receiver and said steam generator.

* * * * *